July 8, 1941.  H. BAETZ  2,248,483
METHOD OF AND APPARATUS FOR REDUCING OXIDE ORE
Filed March 14, 1939
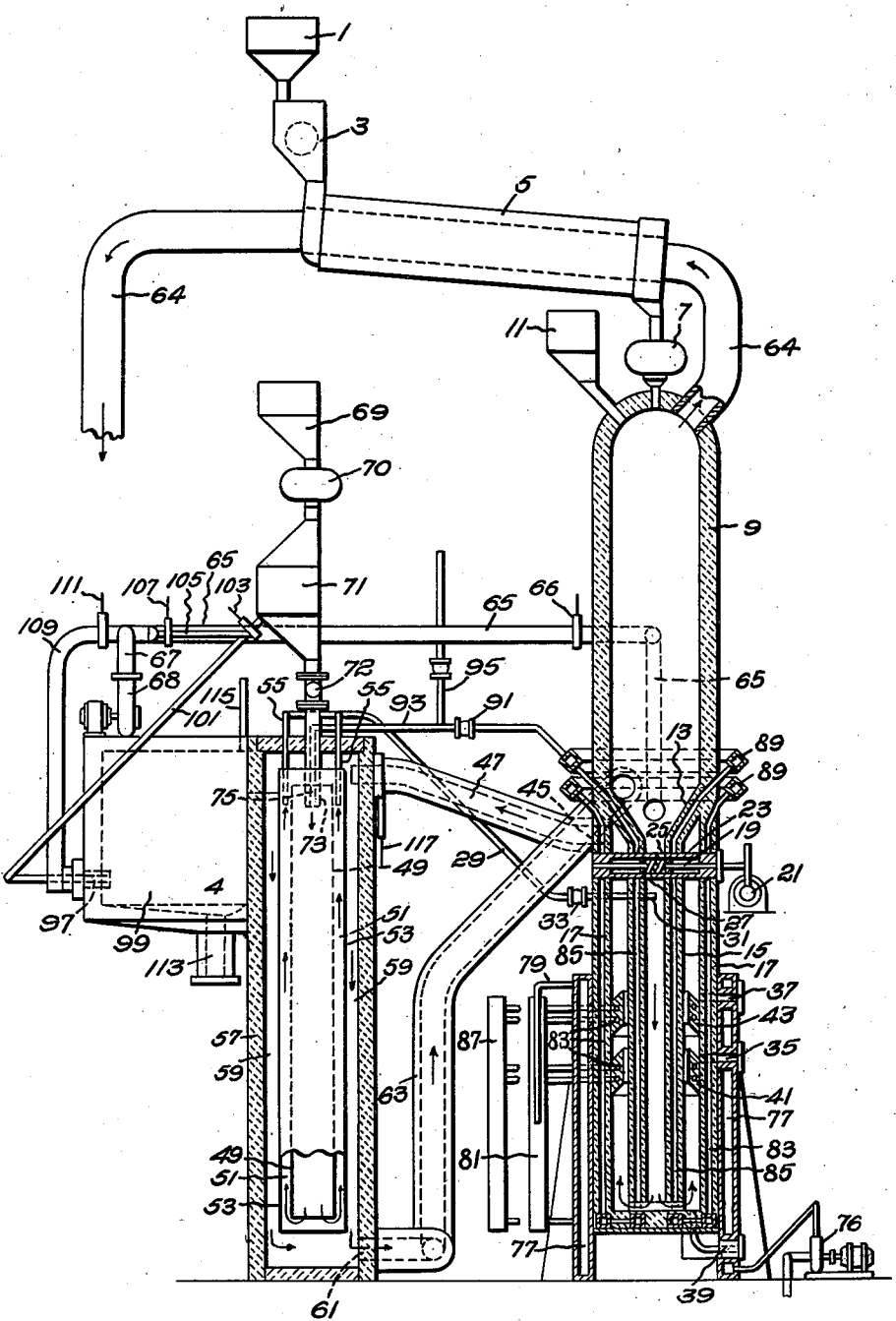
Inventor:
Henry Baetz,
by Emery, Booth, Townsend, Miller & Widner
Attys Patented July 8, 1941

2,248,483

UNITED STATES PATENT OFFICE 2,248,483

METHOD OF AND APPARATUS FOR REDUCING OXIDE ORE

Henry Baetz, Brookline, Mass.

Application March 14, 1939, Serial No. 261,743

13 Claims. (Cl. 75—91)

This invention relates to the reduction of iron ore embodying iron oxides into ferrous metal by a simple and economical process and apparatus.

One object of the invention is to reduce the ore to ferrous metal by a continuously maintained reaction, under temperatures sufficient to effect such reduction and to convert the metal into a state of fluidity, this being accomplished with the aid of a gaseous reducing medium substantially free from the nitrogen constituent of atmospheric air. This reaction is preferably carried out with the gas maintained under pressures substantially above atmospheric pressure.

Another object is to secure economy in the reducing process by making it practicable to use a reducing medium derived from a fuel of relatively low value.

In the embodiment of the invention submitted for illustrative purposes, this reduction is accomplished by a continuous supply of water gas generated under pressure and so supplied to a reducing chamber as to react on the ore, which latter, having been previously crushed or pulverized and preferably dried and preheated, is continuously supplied to be subjected, under the necessary temperature conditions, to the action of a suitable excess of the water gas to completely reduce the ore and raise it to a fluid condition.

The gaseous products of the reaction, comprising principally carbon dioxide and steam with the unconsumed excess of water gas, under the pressure maintained in the reducing chamber, are caused to pass downward and thence upward through the molten body, agitating the latter and causing the slag and lighter impurities to rise and separate from the molten metal so that their separated accumulations may be tapped at their different levels. The escaping gases are conducted to the water gas generator and a portion of their heat utilized in maintaining the temperature required for the water gas reaction. The heat then remaining in such products may be utilized for the preheating or drying of the ore or for the production of steam or power in other forms.

In the illustrative form of the apparatus, water gas is generated under the required pressure and temperature by the submission in a suitable mixing chamber of a continuous supply of carbonaceous fuel to the action of one or more jets of steam raised to a suitable temperature, and subjecting the mixture to the effect of the heat derived from the gaseous products of the ore reduction. Steam for this purpose, under the necessary pressure and temperature, may be conveniently produced by a system of heat interchange passages or conduits associated with the reducing chamber or its parts, to which passages water is supplied from a water pump. This association, through the ensuing heat interchange, converts the water into steam, raises its temperature to that required, and, at the same time, controls and limits the temperature attained by the molten products and serves to protect the walls of the reducing chamber and other associated parts against excessively high temperatures.

The described reduction being carried out in an atmosphere of water gas, under a pressure above that of the outside atmosphere, is substantially free from the effect of atmospheric air and from the presence of the inert nitrogen constituent of such air, the nitrogen introduced into the system being only in unsubstantial amounts such as may be entrained with or be contained in the iron ore entering the retort, or the carbonaceous fuel entering the gas generator. This reduction process may accordingly be carried out not only continuously but rapidly and efficiently.

These and other objects of the invention will be best understood from the following description when taken in connection with the accompanying illustration, while its scope will be more particularly pointed out in the appended claims.

The drawing shows, in elevation and partial section, an apparatus embodying one form of the invention.

Referring to the drawing and to the illustrative embodiment of the invention there shown, the iron ore is delivered from an ore bin 1 to an ore crusher 3, passing thence through a drying chamber 5 to a grinder 7, the latter serving to pulverize the ore. From the grinder it is delivered to the top of a chamber 9, where its accumulated mass is subjected to a preheating action, as by that of the waste gases derived from the reducing process. The ore bin, crusher, grinder and drying chamber are shown conventionally, the latter, however, preferably comprising a motor-driven drying drum internally heated, also by the waste gases. The top of the preheating chamber also has connection to a bin 11 from which lime or other materials which may be found desirable to flux the ore in its reduction may be supplied through any suitable feeding means to mingle with the pulverized ore.

The preheating chamber 9 of generally cylindrical form is constructed of refractory material and has converging bottom walls 13 forming a restricted discharge mouth, through which a controlled and measured delivery of the pulverized ore may be made to a cylindrical reducing chamber or tubular retort 15, forming in effect below the preheater a prolongation of the narrowed walls of the latter.

The reducing chamber is also constructed of refractory material but to assist in withstanding internal pressures it may be reinforced by a heat resisting metal such, for example, as an alloy of steel containing a substantial percentage of chromium and molybdenum.

The reducing chamber tube 15 is surrounded by a cylindrical casing 17, also of refractory material, of larger diameter than the tube, leaving an intermediate annular crucible chamber, into the lower end of which the bottom of the reducing tube opens. The casing 17 forms a support for and an extension of the larger diameter wall of the preheating chamber but communication between the latter and the crucible chamber is cut off by the converging walls 13 of the preheater. The lower part of the crucible chamber forms a basin for the liquid iron and the slag resulting from the reducing action, and the upper part a collecting chamber for the gaseous products of the reaction.

Communication between the discharge mouth of the preheating chamber 9 and the top of the reducing chamber 15 is controlled by any suitable feeding device, such as a feed screw 19, driven in any desired manner, as by the motor 21. The feed screw is journaled in a water cooled sleeve 23 which extends transversely through the walls of the crucible chamber and through the upper part of the reducing tube, closing the discharge mouth of the preheater except for an opening 25 in the exposed top of the sleeve 23. The feed screw receiving the pulverized ore through the opening 25 forces it through the sleeve to the underlying discharge opening 27, through which it is discharged into the mouth of the reducing tube against the pressure of the gas there maintained. The rate of feed of the ore to the reducing tube may be controlled by varying the rate of rotation of the feed screw.

On entering the reducing chamber, the preheated and finely divided iron oxide ore is immediately subjected to the reducing action of water gas under pressure and under temperatures sufficiently high to reduce the ore and free the iron in molten form from the oxides and other impurities. This water gas is delivered to the top of the reducing chamber just below the entrance of the pulverized ore through a gas delivery conduit 29, which passes through the walls of the crucible and the tube and terminates in the appropriately positioned nozzle 31, the conduit 29 having a valve 33 for controlling the amount of gas supplied.

The crucible chamber is provided at one level with a discharge opening 35 for the molten iron, and a similar discharge opening 37 at a higher level for the slag, both discharge openings being kept closed by the plugs of fire clay until the fluid metal level rises above the outlet 35 and the slag level rises above the outlet 37, when they are tapped and the slag and metal are drained off in separate continuous streams. A drain 39, also closed by fire clay plug, is provided at the bottom of the crucible to drain off all metal left in the crucible when the reduction operation is stopped.

The discharge from the reduction tube is close to the bottom of the crucible to provide a restricted outlet to the latter for the metal and gaseous products of the reaction and to cause a turbulent upward flow of the gases through the metal by the pressure imposed in the top of the reduction tube. There is additionally provided within the crucible chamber a baffle 41 just below the discharge opening 35 and a similar baffle 43 just below the discharge opening 37 for the upwardly flowing metal, slag and gases. These baffles are so shaped and positioned as to force the gases to ascend in a path suitably removed from the slag and metal discharges to prevent their escape through those openings. The gaseous products pass upward to and through the gas collecting chamber about and above the sleeve 23 and through an outlet 45 in the top of the chamber, the outlet communicating with the conduit 47 which leads to the water gas generator.

The water gas generator as herein shown comprises an inner, elongated, tubular member 49 within which the mixture of steam and fuel takes place, this tube being open at both the top and bottom. The mixed steam and fuel pass down this tube, through its open bottom, and thence upward through an annular water-gas generating chamber 51 formed between the tube 49 and a surrounding but larger tubular member 53, the latter being closed both at the top and the bottom. The direction of flow is indicated by the arrows. From the top of the annular gas space 51, the gas is discharged through one or more discharge pipes 55 connected to the gas delivery conduit 29. The tubes 49 and 53 are formed of heat resisting material, such as chromium-molybdenum steel.

The mixing tube 49 is supported (through means not herein shown) by the outer surrounding tube 53, and the latter is supported (by means also not shown) in a still larger cylindrical casing 57 of refractory material surrounding the tube 53 and leaving an intermediate annular heating chamber 59 with a clearance at the top and bottom of the tube 53. The chamber 59 is closed except for the entrance at the top and the discharge at the bottom of the gaseous products of the reducing action. The latter enter the annular heating chamber 59 in a tangential relation from the conduit 47 so that they circulate around and down the annular space 59, which serves to apply the high temperature of such gaseous products in maintaining the necessary temperature to produce the water gas reaction in the annular generating chamber 51 and furnish the gas at the temperature desired to the reducing tube. The gaseous products leave the annular chamber 59 at its bottom, also in a tangential relation, through the outlet 61, whence they pass through the conduit 63 to the bottom of the preheating chamber 9. From the chamber 9 they are discharged into the conduit 64 which carries them first through the ore drier 5 for drying the ore, and then conveys the waste gas for the utilization of its remaining heat for any desired purpose, such as the production of steam, power or the like.

The gaseous products which enter the bottom of the preheater 9 from the conduit 63 at a high temperature contain a certain proportion of unconsumed constituents. To utilize these in preheating the ore, they are burned in whole or in part at the bottom of the preheater by the supply thereto of a limited amount of air through the pipe 65 entering the bottom of the preheater, this supply being under the control of a gate or valve 66. Air is supplied to the pipe 65 by connection to the discharge pipe 67 of a motor-driven air blower 68.

The generation of the water gas is effected under pressure and at a high temperature by the continuous supply of carbonaceous fuel and steam into the top of the generating chamber 49. Various types of fuel may be employed, such as coal, coke breeze, sawdust, or even heavy fuel oil left over as a residue from refining processes, but herein the process is described as utilizing finely divided coal in such form as is procured from low grades of coal not usually burned by ordinary combustion processes.

The coal used for the generation of the water gas is delivered from the coal bin 69 to the coal grinder 70, whence it passes into the coal bin 71. From the bin 69 the coal in finely divided form, through the action of the grinder or additional pulverizing means if desired, is forcibly delivered to the top of the mixing chamber 49 by means of a suitable measuring and feeding device, such as a power-driven screw 72, through the fuel supply pipe 73, which passes through the top of the cover of the heating chamber 57 and the top of the tubular member 53, terminating in an open mouth at the top of the mixing chamber. Steam under pressure and at a high temperature is also discharged into the top of the mixing chamber and is caused to commingle with the pulverized fuel therein by means of a steam delivery pipe 75 contained within and surrounded by the fuel delivery pipe 73.

To supply the steam to the water gas generator at the required pressure and temperature, there is provided a motor-driven water pump 76 for delivering water under pressure to the bottom of a water jacket 77 which surrounds the crucible chamber 17. From the top of the water jacket, the water is forced through the pipe 79 into the water feed header 81, whence it is distributed by pipe connections as indicated in the drawing to a system of heat interchange passages 83 formed in the walls of the crucible and within the two baffles 41 and 43, and also to similar passages 85 formed in the walls of the reduction tube. The interchange of heat between the fluid passing through these passages and the high temperature gaseous and fluid products within the ore reduction tube and the crucible serves to convert the water into steam, raising the temperature of the latter to a high point, and at the same time to keep the temperature of the walls of the reduction tube and crucible within such limits as to prevent deterioration of the materials of which they are constructed. The system of passages described also has pipe connections to a steam pressure equalizing header 87 for the purpose of equalizing the pressure of the steam in the different parts of the system.

The high temperature steam generated in the system of conduits described passes upward through pipe connections to the steam headers 89, which in turn are connected through the controlling valve 91 and the pipe connection 93 to the steam delivery pipe 75, discharging into the mixing tube 49, the valve 91 permitting a measured control over the steam admitted to the generator.

It is to be understood that for simplicity and clearness many of the structural features of the apparatus herein described are illustrated in the drawing merely in a conventional form.

The temperatures maintained in the crucible, reducing tube, water gas generator, the steam supplied thereto and in the pulverized ore, and water gas delivered to the reducing tube are subject to control but may be varied within such wide limits as are necessary for operation. The temperatures in the water gas generator and in the reducing tube should be sufficient to produce reasonably rapid reactions and temperatures sufficiently high to maintain the reduced ore in a fluid state without damage to the walls of the crucible and reducing tube. These temperatures may not only be varied but may be reached and controlled in different ways. For example, the temperatures under which the reducing action takes place may be reached by preheating the pulverized ore to a relatively high temperature and supplying the water gas at a relatively low temperature, or vice versa. It will be understood therefore that the specific temperatures hereinafter referred to are mentioned as examples only for illustrative purposes and are not to be taken in any sense as limitations.

After the reduction process has been started into full operation by the means hereinafter described, the action is as follows:

Through the provision of the supply of water under the pressure of the pump through the water jacket and heat interchange passages, steam is delivered to the water gas generator at a pressure substantially above that of the atmosphere. Such pressure, for example, may be of the order of 50 pounds or more to the square inch. The steam enters the mixing tube at a temperature sufficiently high to promote the formation of water gas by the conversion of the steam and the carbon of the fuel into carbon monoxide and hydrogen.

To insure a rapid reaction, the temperature maintained in the generating chamber 51 is preferably of the order of from 1700° to 1900° F. Temperatures of a higher order may be made use of if the materials of which the generating tubes are composed are capable of withstanding them. The necessary temperature of the entering stream may be reached and maintained by the abstraction of heat in the heat interchange conduits from the products of the reducing action of the reducing tube and crucible.

The temperature of the products in the reducing tube and crucible is of the order of 3000° F. or more, being preferably kept below such limits as 4000° F. by the cooling effect of the water and the steam in the heat interchange conduits, so that injury to the walls will not result. The gaseous products of the reduction therefore pass upward through the molten mass and out of the gas collecting chamber, and are delivered to the top of the heating chamber 59 of the water gas generator at a temperature which may be of the order of 3000° F. Passing downward through the heating chamber 59, a part of their heat is imparted to the generation of the water gas in the generating chamber 51, so that the gaseous products emerge from the bottom of the heating chamber 59 and are delivered to the bottom of the preheater at temperatures which may be of the order of 2000° F. or more. The pulverized iron oxide ore, preheated by the gases passing the bottom of the preheater and by the burning therein of unconsumed constituents, is accordingly delivered to the reduction tube at a temperature approximating 2000° F., while the water gas generated in the chamber 51 and heated in its passage therethrough by the hot products of reduction, is delivered to the reduction tube at an approximating temperature which may be, for example, of the order of 1800° F. These conditions effect the reduction of the iron ore with the liberation of heat, raising the temperature of the ore and converting the metal and impurities into a fluid state in which they gravitate to the bottom of the tube and crucible.

The pressure under which the steam is supplied to the water gas generator and under which the water gas is supplied to the reduction tube maintains a pressure in the top of the reduction tube sufficient to overcome the liquid head of the molten mass and to force the gaseous products down through the reduction tube and thence upward through the crucible, passing through the molten body and agitating the same, serving better to separate the lighter slag from the molten iron.

The gaseous products, after preheating the pulverized ore in the preheater 9, pass out of the top thereof at a reduced temperature, for example, of the order of 1500° F., and thence through the ore drier 5, emerging therefrom at a further reduced temperature, for example, of the order of 500° F., in which condition they are available for further useful work.

The supply of water to the heat interchange passages, steam and fuel to the water gas generator, and water gas and ore to the reduction chamber are all subject to such control and regulation that after the reducing process has started into operation the desired temperatures and reactions may be maintained in all parts of the system.

To start the apparatus initially into operation, use, if desired, may be made temporarily of water gas produced by a separate and independent source (not shown) and supplied through the pipe 29 to the reduction chamber at the required temperature and pressure. As the reducing action builds up the temperature in the water gas generator, fuel is supplied thereto and also steam at the desired pressure and temperature from a separate source through the valve controlled pipe 95. The supply of water gas from such separate source is then replaced by that from the generator. As the heat interchange passages become effective to supply the steam to the water gas generator, the supply of steam through the pipe 95 is gradually cut off, leaving the apparatus operating as previously described.

Generation of water gas to start the apparatus, however, may be developed by the apparatus, shown more or less conventionally in the drawing. To this end a mixture of air and pulverized coal is supplied to a burner 97 and burned in the combustion chamber 99. The coal is supplied to the burner through the pipe 101 which opens out of the coal bin 71 and is under the control of the gate 103. Air from the blower 68 delivered through the pipe 105 controlled by the valve 107 forces the pulverized coal through the pipe 101 to the burner. Additional air to support combustion is supplied to the burner from the blower through the pipe 109 controlled by the valve 111. The combustion chamber is provided with a normally closed drain 113 from which slag formed therein may be withdrawn.

The hot products of combustion pass from the combustion chamber 99 into the water gas heating chamber 59 through a passage at the top of the combustion chamber controlled by the gate valve 115, communication between the heating chamber 59 and the conduit 47 being temporarily closed or partly closed by the gate valve 117. Steam is then admitted to the mixing tube 49 from the independent source through the pipe 95, together with fuel from the bin 71 through pipe 73 to start the generation of water gas. When this is appreciably under way and the ore reduction starts in the reduction tube, the gate valve 117 is opened, the burner cut out of operation, the steam supplied from the pipe 95 replaced by steam generated in the heat interchange passages, and the operation then proceeds as previously described.

It will be observed that the generation of water gas is carried out under such conditions that the resulting product has utility not only for the reduction of iron and other oxide ores, but for other industrial purposes as well where a high temperature water gas free from diluent elements and of a high fuel content is desired.

The generation of the water gas takes place with the steam under a relatively high pressure and temperature and with the exclusion of inert elements, such as the nitrogen constituent of the air, which would otherwise act as a diluent of the gas. Temperatures of a very high order may be imparted to the gas as generated. The steam supplied may be controlled so that the steam content is substantially only that required for the water gas reaction. An excess of carbonaceous material will result only in such excess being carried through as fuel in suspension.

As a purely fuel gas to be burned with air or oxygen in ore reduction or for use in other industrial processes, much higher combustion temperatures can be attained because the gas itself is in a highly preheated state, containing a high percentage of combustible constituents, and a relatively slight excess of oxygen or air is required to reach complete combustion. The gas being under pressure, it may be used in pressure combustion processes at the pressure under which it is supplied, tending to prevent the products of combustion from resolving into their constituent gases, with the attendant absorption of heat.

Claims directed to gas generation are presented in a co-pending divisional application, Serial No. 291,231, filed October 6, 1939.

While I have herein shown and described for the purpose of illustration one specific form of the apparatus for carrying out the described process and one specific exemplification of the process itself, it is to be understood that extensive deviations and departures may be made from the apparatus illustrated and the method described, all without departing from the spirit of the invention.

I claim:

1. In an apparatus for reducing an oxide ore, the combination of a crucible for holding a molten body, a reducing chamber, the lower part of which communicates with the lower part of the crucible for the discharge of its products thereinto, a preheating chamber, means for effecting a controlled feed of finely divided ore from the preheating chamber into the upper part of the reducing chamber, a water gas generator comprising a mixing chamber and a generating chamber, means for feeding finely divided carbonaceous material to the mixing chamber, means for supplying steam under pressure substantially above atmospheric also to said mixing chamber, means for conducting water gas from the generating chamber to the reducing chamber to intermingle with the ore under a temperature sufficient to convert the ore into a fluid state, means for causing the gases in their exit from the reducing chamber to pass under the pressure therein through the molten body in the crucible, means for conducting the gases from the crucible to the water gas generator to utilize the heat therein for the generation of the water gas, means for conducting the gases thence to the preheater to preheat the ore, means for supplying air to the preheater to burn the unconsumed constituents of the gases, heat interchange passages in the walls of the crucible and reducing chamber, and means to supply water thereto for generating steam supplied to the water gas generator and for cooling said walls.

2. In an apparatus for reducing an oxide ore, the combination of a crucible for holding a molten body, a reducing chamber, the lower part of which communicates with the lower part of the crucible for the discharge of its products thereinto, a preheating chamber, means for effecting a controlled feed of finely divided ore from the preheating chamber into the upper part of the reducing chamber, a water gas generator comprising a mixing chamber and a generating chamber, means for feeding finely divided carbonaceous material to the mixing chamber, means for supplying steam under pressure substantially above atmospheric also to said mixing chamber, means for conducting water gas from the generating chamber to the reducing chamber to intermingle with the ore under a temperature sufficient to convert the ore into a fluid state, means for causing the gases in their exit from the reducing chamber to pass under the pressure therein through the molten body in the crucible, gas baffling means in the crucible, means for conducting the gases from the crucible to the water gas generator to utilize the heat therein for the generation of the water gas, and means for conducting the gases thence to the preheater to preheat the ore.

3. In an apparatus for reducing an oxide ore, the combination of a crucible for holding a molten body, a reducing chamber, the lower part of which has a discharge for its products into the lower part of the crucible, a preheating chamber with means for preheating the ore, means for feeding preheated finely divided ore from the preheating chamber into the upper part of the reducing chamber, means for supplying water gas also into the upper part of the reducing chamber under a pressure substantially above atmospheric and subject to a temperature sufficient to convert the preheated ore into a fluid state, and means for withdrawing the gaseous constituents from the reducing chamber through the upper part of the crucible.

4. In an apparatus for reducing an oxide ore, the combination of an upright casing, the lower part of which provides a crucible chamber for holding a molten body and the upper part a gas collecting chamber, a reducing chamber within said casing having its walls surrounded by said crucible chamber and having an opening at its lower end for the discharge of its products into the lower part of the crucible chamber, means for feeding into the upper part of the reducing chamber finely divided preheated ore and also a reducing gas maintained under pressure substantially above atmospheric and subject to a temperature sufficient to convert the preheated ore into a fluid state, means for causing the gases in their exit from the reducing chamber to pass under said pressure through the bottom of the reducing chamber, through the molten body and into the gas collecting chamber, and means for discharging the gases therefrom.

5. In an apparatus for the reduction of an oxide ore, the combination of a crucible, a reducing chamber, the lower part of which communicates with the crucible for the discharge of its products thereinto, means for effecting a controlled feed of finely divided preheated ore into the upper part of the reducing chamber, a reducing gas generator with means for effecting through thermal reaction a supply of reducing gas, means for supplying reducing gas from said generator to the upper part of the reducing chamber to intermingle with the ore under a temperature sufficient to convert the ore into a fluid state, means for conducting the gaseous constituents from said reducing chamber to the reducing gas generator to utilize the heat therein for the generation of the gas, and means for conducting the gases thence to preheat the ore.

6. In an apparatus for the reduction of an oxide ore, the combination of a crucible, a reducing chamber opening into the crucible, means for feeding ore to the reducing chamber, means for supplying water gas under pressure to the reducing chamber comprising a water gas generator having a cylindrical mixing chamber, a surrounding generating chamber communicating with the mixing chamber, a heating chamber related to the generating chamber to supply heat thereto, means for supplying finely divided carbonaceous material and steam to the mixing chamber, means for conducting the gaseous constituents of the reducing action first to the heating chamber to supply heat for the thermal reaction in the generation of the water gas, and means for conducting said gases thence to preheat the ore.

7. In an apparatus for the reduction of an oxide ore, the combination of a crucible, a reducing chamber opening into the crucible, means for feeding ore to the reducing chamber, means for supplying water gas under pressure to the reducing chamber comprising a water gas generator having a mixing chamber, a heating chamber related to the generating chamber to supply heat thereto, means for supplying finely divided carbonaceous material and steam to the mixing chamber, and means for conducting the gaseous constituents of the reducing action to the heating chamber to supply heat for the thermal reaction in the generation of water gas.

8. The process of obtaining metal from its oxide ore, which consists in intermingling carbonaceous material and steam under pressure substantially above atmospheric, subjecting them to a temperature sufficient to produce a continuous supply of water gas by thermal reaction, preheating the pulverized ore, continuously feeding the preheated ore with an excess supply of said water gas to a confined space maintained under pressure substantially above atmospheric and at a temperature sufficient to convert the ore into a molten state, causing the gaseous constituents to pass from said confined space under said pressure through the molten body, utilizing heat remaining in said constituents first for the thermal reaction in the production of the water gas and then in the preheating of the ore, and utilizing the heat from the reducing action and the molten body in the generation of steam supplied for generating the water gas.

9. The process of obtaining metal from its oxide ore, which consists in subjecting steam under pressure substantially above atmospheric together with carbonaceous material to a temperature sufficient to produce a supply of water gas through thermal reaction, subjecting the ore in a preheated state to the reducing action of an excess supply of such gas in a confined space under a pressure substantially above atmospheric and at a temperature sufficient to convert the ore into a molten state, forcing the gaseous constituents downward under said pressure and thence upward htrough the molten body, utilizing heat remaining in said constituents for the thermal reaction in the production of the water gas, utilizing further heat remaining in said constituents for preheating the ore, and utilizing the heat from the reducing action and the molten body for the production of steam supplied to the water gas.

10. The process of obtaining metal from its oxide ore, which consists in subjecting steam under pressure substantially above atmospheric together with carbonaceous material to a temperature sufficient to produce a supply of water gas through thermal reaction, subjecting the ore in a preheated state to the reducing action of an excess supply of such gas in a confined space under a pressure substantially above atmospheric and at a temperature sufficient to convert the ore into a molten state, forcing the gaseous constituents downward under said pressure and thence upward through the molten body, utilizing heat remaining in said constituents for the thermal reaction in the production of the water gas, and utilizing further heat remaining in said constituents for preheating the ore.

11. The process of obtaining metal from its oxide ore, which consists in subjecting steam under pressure substantially above atmospheric together with carbonaceous material to a temperature sufficient to produce a supply of water gas through thermal reaction, subjecting the ore in a preheated state to the reducing action of an excess supply of such gas in a confined space under a pressure substantially above atmospheric and at a temperature sufficient to convert the ore into a molten state, forcing the gaseous constituents downward under said pressure and thence upward through the molten body, and utilizing heat remaining in said constituents for the thermal reaction in the production of the water gas.

12. The process of obtaining metal from its oxide ore, which consists in subjecting steam under pressure substantially above atmospheric together with carbonaceous material to a temperature sufficient to produce a supply of water gas through thermal reaction, subjecting the ore in a preheated state to the reducing action of an excess supply of such gas in a confined space under a pressure substantially above atmospheric and at a temperature sufficient to convert the ore into a molten state, and forcing the gaseous constituents downward under said pressure and thence upward through the molten body.

13. In an apparatus for reducing an oxide ore, the combination of a crucible for holding a molten body, a reduction chamber with a discharge for its products into the lower part of the crucible, means for feeding finely divided ore to the reduction chamber, means for feeding into the reduction chamber water gas maintained under a pressure substantially above atmospheric, means for preheating the water gas and the ore before introduction into said reduction chamber to provide a temperature therein sufficient to reduce the ore and convert it into a liquid state, means for causing the gases in their exit from the reduction chamber to pass under said pressure through the molten body in the crucible, and means to utilize said gases in preheating the reducing gas and in preheating the ore.

HENRY BAETZ.